United States Patent [19]

Clark et al.

[11] Patent Number: 4,790,454

[45] Date of Patent: Dec. 13, 1988

[54] SELF-CONTAINED APPARATUS FOR ADMIXING A PLURALITY OF LIQUIDS

[75] Inventors: Richard J. Clark, Bexar County, Tex.; Stephen R. Horvath, Jr., Racine County, Wis.

[73] Assignee: S. C. Johnson & Son, Inc., Racine, Wis.

[21] Appl. No.: 74,550

[22] Filed: Jul. 17, 1987

[51] Int. Cl.$^4$ .................. B67D 5/48; B67D 5/60
[52] U.S. Cl. ..................... 222/136; 222/145; 222/333; 239/304; 239/310; 239/332; 366/177; 366/262; 366/272; 418/15
[58] Field of Search .......... 222/136, 145, 175, 333, 222/134, 135, 129.1, 129.3, 255, 372, 375, 376, 380, 382, 383; 239/304, 310, 332, 152-154; 417/503; 418/15; 366/177, 262, 272

[56] References Cited

U.S. PATENT DOCUMENTS

| | | | |
|---|---|---|---|
| 2,660,336 | 11/1953 | Coffey et al. | 222/372 X |
| 2,735,440 | 2/1956 | Kalle | 222/134 X |
| 2,736,466 | 2/1956 | Rodth | 222/136 |
| 3,232,585 | 2/1966 | Garbarino, Jr. et al. | 239/153 X |
| 3,390,638 | 7/1968 | Adams | 418/15 X |
| 3,420,180 | 1/1969 | Behrends et al. | 418/15 |
| 3,454,042 | 7/1969 | Phillips | 239/302 X |
| 3,640,461 | 2/1972 | Koll | 239/304 X |
| 3,642,173 | 2/1972 | Marraffino | 222/136 X |
| 3,894,690 | 7/1975 | Hill | 222/135 X |
| 3,900,165 | 8/1975 | Parke et al. | 239/375 |
| 3,901,449 | 8/1975 | Bochmann | 239/332 |
| 3,904,116 | 9/1975 | Jones et al. | 222/333 X |
| 3,964,689 | 6/1976 | Horvath, Jr. | 239/318 |
| 3,993,250 | 11/1976 | Shure | 239/332 |
| 4,079,861 | 3/1978 | Brown | 222/333 X |
| 4,182,491 | 1/1980 | Parke et al. | 239/11 |
| 4,208,013 | 6/1980 | Coleman et al. | 239/351 |
| 4,544,084 | 10/1985 | Cleland | 222/129.2 X |
| 4,618,099 | 10/1986 | Nagao et al. | 222/333 X |
| 4,621,770 | 11/1986 | Sayen | 239/304 |
| 4,651,903 | 3/1987 | Pagliai | 222/333 X |
| 4,673,296 | 6/1987 | Sjogren | 222/137 X |
| 4,697,739 | 10/1987 | McCracken | 222/145 X |

Primary Examiner—Kevin P. Shaver

[57] ABSTRACT

This invention relates to a self-contained, portable apparatus for admixing a plurality of liquids. The liquids, generally a diluent (such as water or an organic solvent), together with dilutable liquid chemical concentrates such as pesticides, fertilizers, and the like, are automatically proportioned and blended together to produce a resultant mixture, with controlled dispensing of the resultant mixture. The apparatus, which may be hand carried, is preferably powered by a battery source that is operatively connected to a positive-displacement pump. Such positive-displacement pump draws the liquids into the pump, utilizing the pump vacuum force, mixes the liquids in the pump chamber or housing, and thereafter discharges the resultant mixture from the apparatus, utilizing a suitable dispensing device.

18 Claims, 2 Drawing Sheets

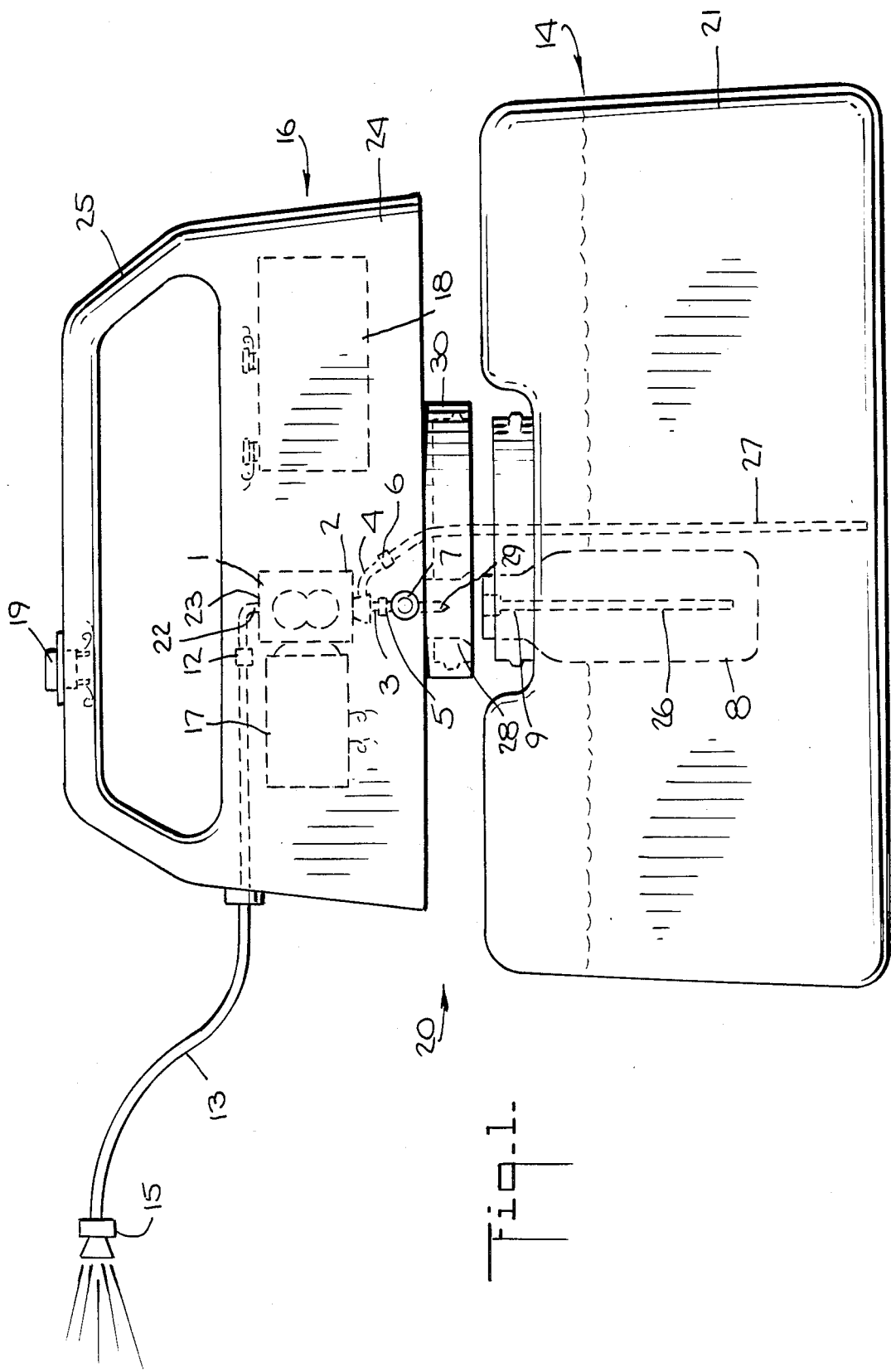

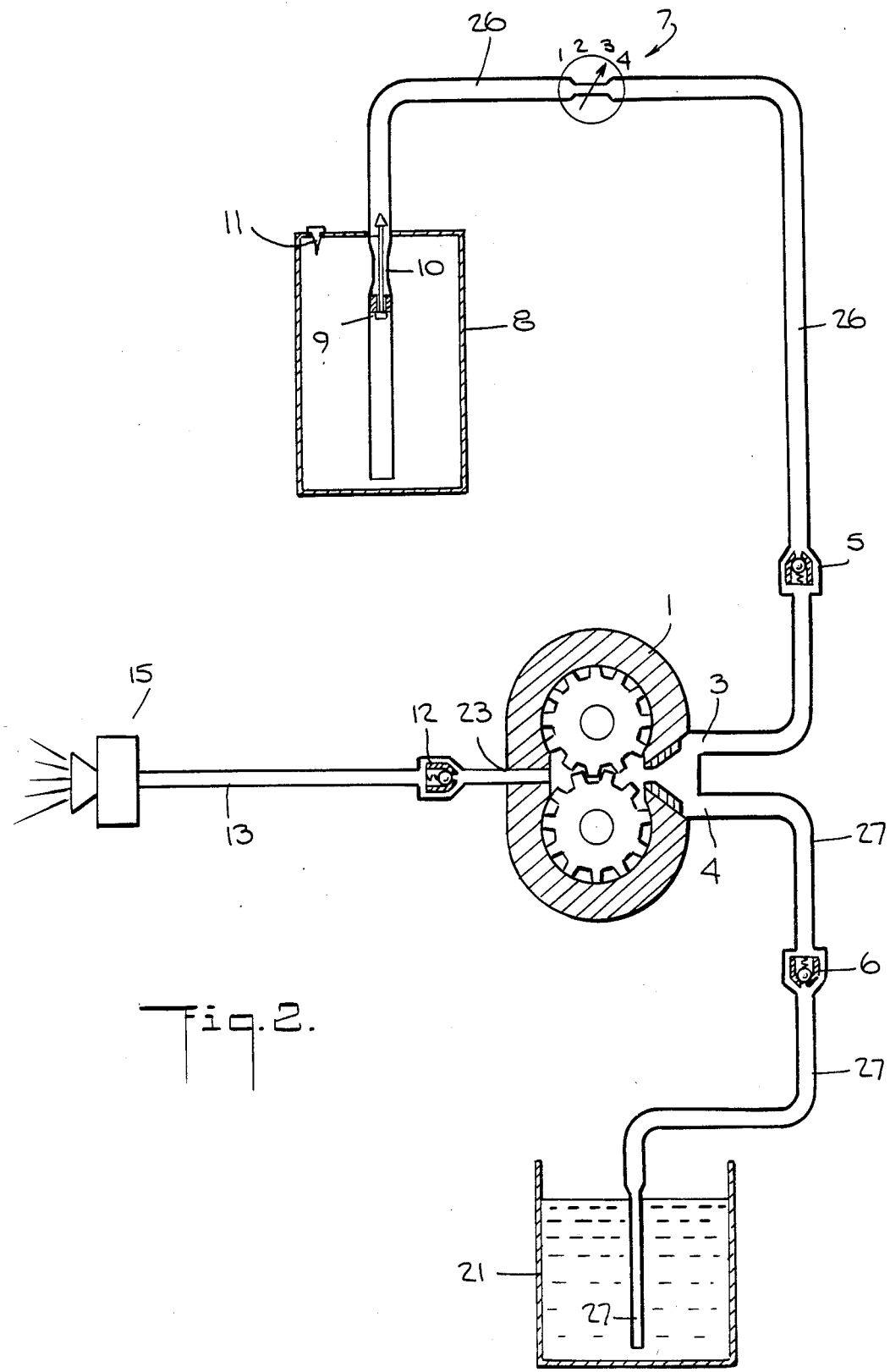

SELF-CONTAINED APPARATUS FOR ADMIXING A PLURALITY OF LIQUIDS

This invention relates to a self-contained apparatus for admixing a plurality of liquids. More particularly, the present invention relates to a self-contained, portable spraying apparatus that automatically proportions and mixes a dilutable chemical concentric with a diluent or with a carrier—either of which (i.e., the diluent or the carrier) can be water, an organic solvent, or the like—and thereafter controls the dispensing rate of the resultant mixture.

BRIEF DESCRIPTION OF THE PRIOR ART

Prior to our discovery of the present invention, the proportioning, blending and dispensing of dilutable chemical concentrates—such as pesticides, soaps, fertilizers, and the like—were achieved by premixing the concentrate with a diluent, typically utilizing manual or mechanical means, and thereafter dispensing the resultant mixture through a common outlet. While the so-called "pump sprayer" is the most widely-utilized apparatus for applying pesticides and fertilizers in this manner, such an apparatus poses not only operational but also environmental problems as well. For example, many a conventional pump sprayer system, which typically requires that an operator mix a predetermined amount of concentrate (in specified, prepackaged dosage or in bulk) with a corresponding specified quantity of diluent, generally poses a variety of problems before such a system can effectively be used in the manner intended. For example, the operator's repeated handling and measuring of the concentrate enhances the possibility of accidental personnel exposure to the chemical concentrate. Second, an improper application may occur by over- or under-filling the sprayer tank with either concentrate or diluent, or by pressurizing the sprayer to an improper pressure level. Further, any left-over liquid that is present in the sprayer oftentimes poses a "disposal" problem that must be taken care of before the sprayer system can again be used to dispense a subsequent mixture.

The prior art discloses a variety of spraying devices for dispensing chemical compositions. For example, U.S. Pat. No. 4,182,491 to Parke et al. (entitled "Remote Control Spraying Apparatus") discloses a spraying apparatus that includes a compressed-air source which feeds air to a nozzle for mixing with a liquid prior to discharge. U.S. Pat. No. 3,964,689 to Horvath discloses an apparatus that attaches to the end of a hose for dispensing various chemical substances such as fertilizers, weed killers, and cleaning compositions. U.S. Pat. No. 4,208,013 to Coleman et al. describes a portable chemical spraying apparatus with a disposable chemical container. The apparatus discharges a mixture of compressed air and a preselected chemical composition, such as a chemical composition that includes an insecticide or a fertilizer. U.S. Pat. No. 3,900,165 to Parke et al. discloses a hand-carriable spraying apparatus that mixes a chemical insecticide with pressurized air in the spraying nozzle prior to discharge. U.S. Pat. No. 3,454,042 to Phillips discloses a portable car-wash machine that utilizes an external water source. U.S. Pat. No. 3,894,690 to Hill describes a complex spraying system for mixing water and chemicals.

The prior art also discloses a variety of mixing and proportioning devices. For example, U.S. Pat. No. 2,735,440 to Kalle discloses a device for the continuous supply of a liquid. The device contains a rotary pump having an inlet for liquid and an inlet for air. The rotary pump also has an outlet for the resultant liquid-gas mixture. The Kalle device does not, however, teach a self-contained, portable apparatus for admixing a plurality of liquids. Rather, the Kalle device mixes two liquids only after the liquid-gas mixture has passed through the rotary pump.

U.S. Pat. No. 2,736,466 to Rodth as well as U.S. Pat. No. 4,079,861 to Brown, each disclose a metering device for measuring, mixing, and dispensing a fluid. U.S. Pat. No. 2,660,336 to Coffey et al. discloses a filling device useful for delivering accurate and uniform predetermined measured amounts of liquids, preferably pharmaceuticals. The Coffey et al. device utilizes a gear pump which is said to have a desirable mixing effect.

None of these prior art devices, either alone or in combination, teach the present invention.

The present invention automatically proportions, blends, and otherwise combines a chemical concentrate together with a diluent—in relatively precisely-measured amounts—all in a fully portable, preferably hand-carriable, self-contained apparatus that virtually prevents operator contact with potentially-hazardous chemical concentrates.

SUMMARY OF THE INVENTION

The present invention relates to a self-contained, portable apparatus for admixing a plurality of liquids. The liquids can be the concentrates; and such liquids can include the water or the solvent.

The self-contained, portable apparatus comprises: (a) a positive-displacement pump, such as a non-pulsating rotary pump, having at least two inlet orifices at the suction side of the pump and at least one outlet orifice at the dispensing side of the pump; (b) a power source for driving the pump; (c) means for preventing the backflow of the mixture of liquids (i.e., reverse flow through the pump) after the mixture has passed the pump; (d) plural conduit means connecting each respective inlet orifice to a separate, liquid-containment vessel; (e) means for preventing the backflow of the liquids that are to be mixed (i.e., preventing backflow of each liquid back into its respective liquid-containment vessel); (f) means for providing a variable or fixed flow rate of at least one of the liquids for effecting desired proportioning of all of the liquids; and (g) dispensing means by which the mixture of liquids can be discharged from the apparatus.

The apparatus operates by drawing liquids from each respective liquid-containment vessel into the positive-displacement pump via the plural conduit means, utilizing the vacuum force of the pump, whereupon the liquids become not only merely added-together in the pump but also generally well-mixed therein as well. The mixture of liquids is thereafter discharged from the pump via the dispensing means.

The means for preventing backflow of the mixture of liquids (after the mixture has passed the pump) may conveniently be located downstream of the pump; and the means for providing a variable or fixed rate of at least one of the liquids may comprise a metering valve located in one of the plural conduit means.

The flow rate of the liquid mixture may of course be controlled by suitable means for controlling either the power source or the speed of the pump. Additionally, and for the sake of compactness, at least one of the plural vessels may be contained within another.

BRIEF DESCRIPTION OF THE DRAWINGS

FIG. 1 is an elevational view of a self-contained, portable apparatus for admixing a plurality of liquids, depicting one preferred embodiment of the apparatus of the present invention.

FIG. 2 is an enlarged schematic representation of yet another preferred embodiment of an automatically-operated proportioning-and-blending device for controlled dispensing of dilutable chemical concentrates which have been admixed with a suitable diluent, also in accordance with the principles of the present invention.

DETAILED DESCRIPTION OF THE PREFERRED EMBODIMENTS OF THE INVENTION

Referring to FIG. 1, there is shown a self-contained, portable apparatus for admixing a plurality of liquids, represented generally by the reference numeral 20. In the illustrated embodiment of this invention, the portable apparatus 20 is divided into two parts, namely, the pump housing 16 and the diluent vessel housing 14. The pump housing (or so-called "chamber") 16 includes a positive-displacement non-pulsating type pump 1 having, preferably, two inlet orifices 3 and 4 at the suction side 2 of the pump, and one outlet orifice 22 at the dispensing side 23 of the pump 1. Further, another pump (embodiment not shown) can include a greater number of inlet orifices, in accordance with the principles of the present invention.

The type of positive displacement pump that is utilized, moreover, is not critical; and any such pump that is able to provide a substantially constant liquid flow without pulsation (such as a non-pulsating rotary, gear-type pump) is preferred.

Of the two inlet orifices 3 and 4 that are located at the suction side 2 of pump 1, one inlet orifice 3 is intended to receive the dilutable chemical concentrate, and the other inlet orifice 4 is intended to receive the diluent. The inlet orifices 3 and 4 are each connected to a respective conduit means, such as conduit 26 for the chemical concentrate and conduit 27 for the diluent. Means (such as a check valve 5) for preventing the backflow of the chemical concentrate into a vessel 8 that is adapted to contain the concentrate (hereinafter referred to as "the concentrate-containing vessel 8") is shown located near the inlet orifice 3.

The concentrate-containing vessel 8 can consist of a non-pressurized vessel such as an aerosol can having a captive-mounting or a similar mounting feature. An aerosol can is oftentimes preferred so as to take advantage of economical packaging and other high-speed filling procedures, and further, to provide a so-called "closed system" until the vessel 8 is ready to be used. A standard, commercially-available aerosol can is preferred and is typically not only provided with a diptube but is typically also crimped with a standard industry valve, to prevent leakage or tampering.

The diluent vessel housing 15 incorporates a vessel 21 that is adapted to contain the diluent (hereinafter referred to as "the diluent-containing vessel 21"), which is connected to the suction side 2 of the pump 1 by the conduit means 27. Flow-check means such as a check valve 6 is also provided for preventing the backflow of filuent into the diluent-containing vessel 21. A variable-rate orifice or so-called "metering" valve is preferred for controlling the flow rate of chemical concentrate from vessel 8; and to this end a metering valve 7 (FIG. 2) is provided in conduit 26. Alternatively, those skilled in the art can appreciate that a preselected fixed-rate orifice—or a plurality of such orifices—can be utilized for controlling the flow rate of the chemical concentrate from vessel 8. As is well known by those skilled in the art, the diameter of such an orifice can be determined by certain variables such as, desired chemical-application rate, chemical concentrate and/or solvent viscosity, total known pressure drop of the dispensing system conduit network, etc.

The gear pump 1 is driven by a conventional power source 18. More particularly, power source 18 drives a conventional motor 17. Still more particularly, motor 17 drives a commercially-available magnet (not shown) which, in turn, drives gear pump 1. The motor 17 is preferably powered by at least one rechargeable battery that is able to provide several houra of intermittent operation. Alternatively, the pump 1 can be powered by a suitable, commercially-available, portable engine (e.g., a commercially-available, suitably-sized, movable gasoline-powered or diesel fuel-powered engine or motor).

By varying selected variables attendant to the power source, e.g. such as varying the voltage of the battery, the flow rate of the mixture of fluids readily can be varied. Both the power source 18 and the motor 17 are each preferably removably attached to a support structure 24 (FIG. 1). Further, the power source 18 more preferably comprises a rechargeable battery contained within the portable apparatus 20. The portable appratus 20 additionally preferably can include carrying means such as the illustrated handle 25 for conveniently carrying the apparatus 20—or the carrying means can be provided in a back-pack type of arrangement (not shown), if desired—for enabling carrying individual liquids at the same time that the apparatus is being used not only to combine the liquids (thereby to produce the liquid mixture) but also to dispense such liquid mixture.

At the dispensing side 23 of the gear pump 1 is located a dispensing means such as a conduit 13 by which the mixture of liquids is carried from pump 1 to the environment which is typically at about atmospheric (i.e. sea level) pressure. The dispensing means 13 contains a check valve means 12 or the like located at the dispensing side 23 of the pump to prvent back-flushing of the mixture of liquids through pump 1 when the apparatus is not in operation. Such a check valve means 12, moreover, serves a secondary purpose, namely, of providing a positive shut-off of flow at the dispensing side 23 of pump 1 when the pump pressure becomes less than the so-called "cracking pressure". ("Cracking pressure" is that pressure which is required to cause a check valve to operate in its "open" position.)

A system dispensing-end nozzle or other chemical composition-distribution means, also contemplated in accordance with the present invention, can be a multi-purpose applicator tip 15, attached for example to the end of conduit 13, as is shown in FIG. 1. Such an arrangement, moreover, conveniently allows for crack-and-crevice as well as fan-spray types of spray patterns either of which are oftentimes preferred in a variety of applications. Those skilled in the art can appreciate that the tip 15 can include an extension (not shown) to provide long-reach capability.

The pump housing 16, in addition to comprising the elements mentioned above, also incorporate an adapter stem 28 for the concentrate-containing vessel 8 as well as a valve-depressing means 29 for depressing a normally-closed valve 9. Also located within pump housing 16 are the motor 17 and power source 18. The motor 17 (as briefly mentioned above) is preferably electrically driven (although it can be driven otherwise, such as hydraulically), while the power source 18 preferably consists of several commercially-available rechargeable batteries.

For example, in certain applications requiring, e.g., relatively-low pressure and corresponding relatively-small flow rates, about 6 to about 9 volts or less can advantageously be used. Whereas in other applications, requiring higher pressures and attendant larger flow rates, about 9 to about 12 volts or more can oftentimes advantageously be utilized, in accordance with the principles of the present invention.

A commercially-available on-off type of switch 19—such as a double-pole double-throw type of switch—provides operative electrical connection of power source 18 to motor 17. An additional attachment point 30—which can include a bayonet-type mount, a conventional threaded connection, or the like—for the diluent vessel housing 14, provides for attachment of pump housing 16 to diluent vessel housing 14. Once these two housings 14 and 16 are attached together, the concentrate-containing vessel 8 can be located within the diluent-containing vessel 21, for providing a compact apparatus 20 that is convenient to carry.

Referring to FIG. 2 of the drawings, there is shown an enlarged schematic representation of the automatic proportioning-and-blending device for controlled dispensing of dilutable chemical concentrates. The illustrated device includes the concentric-containing vessel 8 containing the normally-closed valve 9 and, in turn, the orifice 10 within valve 9.

Valve means 11 such as a duck-bill valve is conveniently located on the vessel 8 to provide atmosphere to the concentrate-containing vessel 8 during operation of the illustrated device.

The conduit 26 connects the concentrate-containing vessel 8 to the positive-displacement pump 1. Located preferably within the concentrate-containing conduit 26 is an orifice 7—which can be either of the variable-rate or of the fixed-flow type—that allows either for the variable or the fixed flow of concentrate, respectively, from the concentrate-containing vessel 8. The check valve 5 for the concentrate, preferably located near the inlet orifice 3 of pump 1, allows the flow of liquid in one direction only, thereby preventing backflow.

The diluent-containing vessel 12 is also attached to the pump 1 by the conduit means 27. The check valve 6 for the diluent, contained within conduit 27 and preferably located near the inlet orifice 4 of pump 1, similarly allows the flow of liquid in one direction only, thereby also preventing backflow.

The conduit 13 by which the mixture of liquids is discharged to the atmosphere through the applicator tip 15 is located at the dispensing side 23 of pump 1. Within such conduit 13 is located the check valve 12, which prevents the backflow of the mixture of liquids through pump 1.

METHOD OF OPERATION

This invention operates in the following manner. The pump housing 16 is first removed from the diluent vessel housing 14 by a twisting-and-pulling motion on the carrying handle 25. The diluent-containing vessel 21 is filled with diluent; and the concentrate-containing vessel 8 is thereafter attached to the pump housing 16 and is seated by tightening the adapter stem 28. The normally-closed valve 9 (of the concentrate-containing vessel 8) is then opened during such a tightening process by means of the diluent vessel housing 14 by a pushing-and-twisting motion.

Whenever on-off switch 19 is activated, so as to create an electrical path from power source 18 to motor 17, pump 1 becomes energized thereby creating a suction in conduits 26 and 27, causing the respective check valves 5 and 6 to open, which in turn renders the chemical-concentrate conduit 26 as well as the diluent conduit 27 essentially "open" from the two liquid-containing vessels 8 and 21 to pump 1. The suction effect of pump 1 then draws the concentrate and diluent from the respective vessels 8 and 21 and introduces these liquids into pump 1 where they are mixed. As the pressure at the dispensing side 23 of pump 1 increases, check valve 12 opens and allows discharge of the mixture of liquids through conduit 13.

Simultaneous to the above-described operation, the valve means 11 on concentrate-containing vessel 8 is actuated by the vacuum effect that is correspondingly created in vessel 8, thereby allowing atmospheric pressure to enter vessel 8. Additionally, the flow of chemical concentrate can be controlled by either a variable-rate or a fixed-rate orifice, such as that orifice means identified by the reference numeral 7 in FIG. 2, such orifice means 7 providing a suitable, desired number of preset positions, each such position preferably being locked by means of a detent. When pump 1 is disconnected from power source 18, such as by releasing the on-off switch 19, check valves 5, 6 and 12 all close, sealing fluid in each respective one of conduits 26, 27 and 13, thereby preventing the cross-mixing of concentrate and diluent medium.

To avoid contamination in any subsequent use of the apparatus 20, such apparatus can be provided with suitable cleaning solution-containing vessels (not shown) to flush out and/or clean out the various conduits (e.g., conduits 13, 26 and 27) of the apparatus 20, as well as the apparatus 20 itself.

What has been illustrated and described herein is a novel apparatus for admixing a plurality of liquids. While the principles of the present invention have been illustrated and described with reference to certain preferred embodiments, the invention is not limited thereto. On the contrary, alternatives, changes or modifications will become apparent to those skilled in the art upon reading the foregoing description. Accordingly, such alternatives, changes and modifications are to be considered as forming a part of the invention insofar as they fall within the spirit and scope of the appended claims.

We claim:
1. A self-contained apparatus for admixing a plurality of liquids to produce a liquid mixture, the apparatus comprising:
   a. a positive-displacement pump means able to provide a substantially constant liquid flow without pulsation and having a suction side, a dispensing side, a plurality of inlet orifices at the suction side thereof, and at least one outlet orifice at the dispensing side thereof;
   b. a power source operatively connected to the pump means for driving said positive-displacement pump means;

c. means, in fluid communication with the outlet orifice of the pump means, for preventing backflow of said liquid mixture through said positive-displacement pump means;
d. a plurality of conduit means, in fluid communication with the pump means and corresponding in number to the plurality of pump means inlet orifices, for providing fluid communication between each pump means inlet orifice and a respective one of a corresponding plurality of liquid-containment vessels;
e. means, in fluid communication with each respective one of the plurality of pump means inlet orifices, for preventing backflow of said plurality of liquids through the plural conduit means back into each respective liquid-containment vessel;
f. means, in fluid communication with one of the plurality of inlet orifices via the corresponding conduit means thereof, for selecting liquid flow rate through said corresponding conduit means relative to liquid flow rate through at least one other of the plurality of conduit means; and
g. dispensing means, in fluid communication with the outlet orifice, by which the liquid mixture can be discharged from said apparatus;
h. whereby said plurality of liquids can be drawn into said positive-displacement pump means from their respective liquid-containment vessels via each respective one of said plural conduit means, can be mixed in said pump means, and can be discharged from said apparatus via said dispensing means.

2. THe apparatus as defined in claim 1 wherein the pump means is a non-pulsating rotary pump.

3. The apparatus as defined in claim 1 wherein said power source comprises at least one battery.

4. The apparatus as defined in claim 1 wherein the liquid flow rate-selecting means comprises a metering valve means.

5. The apparatus as defined in claim 1 wherein at least one of the plural liquid-containment vessels is a dilutable chemical concentrate-containing vessel, and wherein said concentrate-containing vessel includes means for automatically bringing said concentrate-containing vessel to atmospheric pressure.

6. The apparatus as defined in claim 1 further comprising means, operatively connected to the power source, for operatively controlling said power source, thereby to control the flow rate of the liquid mixture from the apparatus.

7. The apparatus as defined in claim 1 wherein at least one of the plural liquid-containment vessels is located within another one of the plural liquid-containment vessels.

8. The apparatus as defined in claim 1 wherein said apparatus further comprises a housing having a cavity, wherein the pump means is disposed in the housing cavity, and wherein the housing defines a carrying handle, for enabling the apparatus to be hand-carriable.

9. The apparatus as defined in claim 8 wherein said power source is removably attached to said housing.

10. A self-contained, portable apparatus for admixing a plurality of liquids to produce a liquid mixture, the apparatus comprising:
a. a positive-displacement non-pulsating gear pump able to provide a substantially constant liquid flow without pulsation and having a suction side, a dispensing side, at least two inlet orifices at the suction side thereof, and one outlet orifice at the dispensing side thereof;
b. an electrically-driven motor operatively connected to the positive-displacement pump;
c. a battery-operated power source operatively connected to the electrically-driven motor for driving said positive-displacement pump;
d. means, in fluid communication with the outlet orifice of the gear pump, for preventing backflow of said liquid mixture through said positive-displacement pump;
e. at least two vessels respectively adapted to contain a diluent and a dilutable chemical concentrate;
f. at least two separate conduit means, in fluid communication with the gear pump and corresponding in number to the plurality of gear pump inlet orifices, for providing fluid communication between each pump inlet orifice and a respective one of said two vessels;
g. valve means, in fluid communication with the chemical concentrate-containing vessel, for controlling flow of concentrate from the chemical concentrate-containing vessel; and
h. dispensing means, in fluid communication with the outlet orifice, by which said liquid mixture can be discharged from said apparatus;
i. whereby diluent and chemical concentrate can each be drawn into said positive-displacement pump from the respective diluent-containing and dilutable chemical concentrate-containing vessels via each respective one of said two conduit means, can be mixed in said positive-displacement pump, and can be discharged from said apparatus via said dispensing means.

11. The apparatus as defined in claim 10 wherein the concentrate-containing vessel is located within the diluent-containing vessel.

12. The apparatus as defined in claim 10 further comprising means, operatively connected to the power source, for operatively controlling said power source, thereby to control the discharge rate from the apparatus.

13. The apparatus as defined in claim 10 further comprising means, carried by the concentrate-containing vessel, for automatically bringing said concentrate-containing vessel to atmospheric pressure.

14. The apparatus as defined in claim 10 wherein said apparatus further comprises a housing having a cavity, wherein the gear pump is disposed in the housing cavity, and wherein the housing defines a carrying handle, for enabling the apparatus to be hand-carriable.

15. The apparatus as defined in claim 14 wherein said power source includes a rechargeable battery removably-mounted within said housing.

16. The apparatus as defined in claim 14 wherein said positive-displacement pump and said power source are each removably attached to said housing.

17. A self-contained, portable, hand-carriable apparatus for admixing a plurality of liquids, the apparatus comprising:
a. a positive-displacement non-pulsating gear pump able to provide a substantially constant liquid flow without pulsation and having a suction side, a dispensing side, at least two inlet orifices at the suction side thereof, and an outlet orifice at the dispensing side thereof;
b. a pump housing defining a cavity, the gear pump being removably disposed in the pump housing;

c. means, operatively connected to the positive-displacement pump, for driving said positive-displacement pump, said pump-driving means including a battery-operated power source and an electrically-driven motor, wherein said battery-operated power source and said motor are each removably attached to the pump housing;

d. a carrying handle unitary with the pump housing;

e. means, in fluid communication with the pump and located downstream of said positive-displacement pump, for preventing backflow of said liquid mixture through said pump;

f. two vessels in fluid communication with the pump and respectively adapted to contain a diluent and a dilutable chemical concentrate, wherein the concentrate-containing vessel is removably attached to the pump housing and is located within the diluent-containing vessel;

g. two conduit means in fluid communication with the pump for providing fluid communication between each of the two inlet orifices and a respective one of the corresponding two vessels;

h. valve means, in fluid communication with the pump, for controlling flow of concentrate from the concentrate-containing vessel into the pump; and i. dispensing means, in fluid communication with the outlet orifice, by which said liquid mixture can be discharged from the apparatus;

j. whereby diluent and dilutable chemical concentrate can each be drawn into said positive-displacement pump from the respective diluent-containing and dilutable chemical concentrate-containing vessels via each respective one of said two conduit means, can be mixed in said positive-displacement pump, and can be discharged from said apparatus via said dispensing means.

18. The apparatus as claimed in claim 17 further comprising means, carried by the concentrate-containing vessel, for automatically bringing said concentrate-containing vessel to atmospheric pressure.

* * * * *